D. G. ANDERSON.
PIPE FITTING.
APPLICATION FILED MAR. 29, 1913.

1,075,281.

Patented Oct. 7, 1913.

Witnesses
C. L. Weed
M. P. Nichols

Inventor
David G. Anderson
by Seymour Pearl
Atty

UNITED STATES PATENT OFFICE.

DAVID G. ANDERSON, OF COLUMBUS, OHIO, ASSIGNOR OF ONE-HALF TO GILBERT R. KITTLE, OF COLUMBUS, OHIO.

PIPE-FITTING.

1,075,281.   Specification of Letters Patent.   Patented Oct. 7, 1913.

Application filed March 29, 1913. Serial No. 757,545.

*To all whom it may concern:*

Be it known that I, DAVID G. ANDERSON, a citizen of the United States, residing at Columbus, in the county of Franklin and State of Ohio, have invented a new and useful Improvement in Pipe-Fittings; and I do hereby declare the following, when taken in connection with the accompanying drawings and the characters of reference marked thereon, to be a full, clear, and exact description of the same, and which said drawings constitute part of this application, and represent, in—

Figure 1:
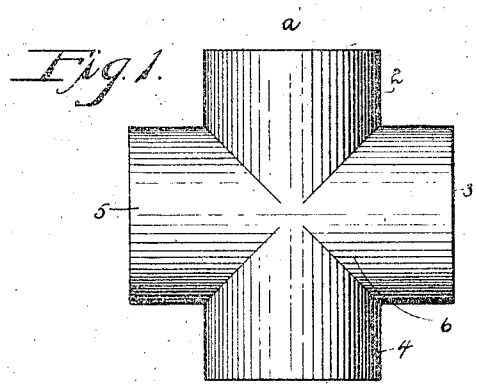
Figure 2:
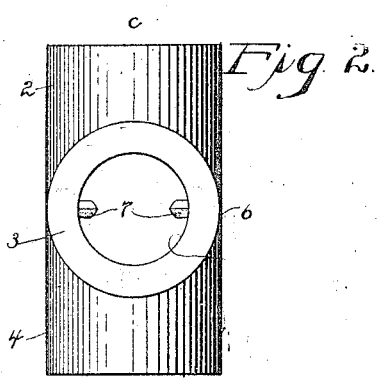
Figure 3:
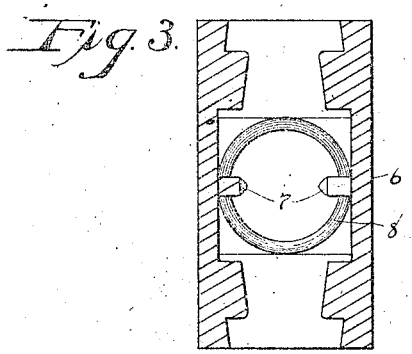
Figure 4:
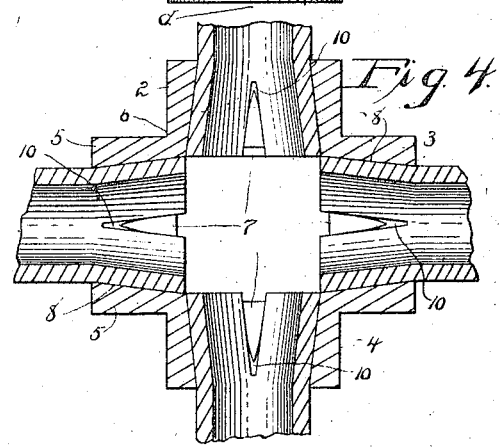
Figure 5:
Figure 6:
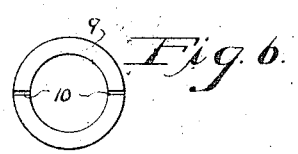
Figure 7:
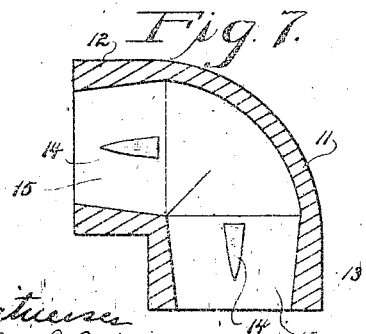
Figure 8:
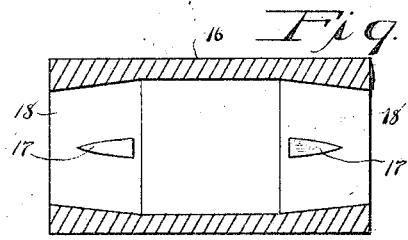

Figure 1 a plan view of one form which a pipe fitting constructed in accordance with my invention may assume. Fig. 2 a side view thereof. Fig. 3 a sectional view thereof on the line *a—b* of Fig. 1. Fig. 4 a view thereof in section on the line *c—d* of Fig. 2. Fig. 5 a broken view in side elevation of one end of a pipe formed with a longitudinal slot adapting it to be expanded in my improved fitting. Fig. 6 a view of the pipe in end elevation. Fig. 7 a sectional view of an elbow pipe-fitting embodying my invention. Fig. 8 a corresponding view of a sleeve-coupling embodying my invention.

My invention relates to an improvement in pipe fittings, the object being to produce a simple, convenient and strong pipe-fitting adapted to assume a variety of forms according to the circumstances of use, and particularly designed for use in the installation of pipe-railings, and designed to save the time, labor and expense attendant upon the threading of the pipe-fittings and pipe-sections or lengths.

With these ends in view, my invention consists in a pipe-fitting having certain details of construction as will be hereinafter described and pointed out in the claims.

In carrying out my invention as shown in Figs. 1 to 6 inclusive, the four integral arms 2, 3, 4 and 5 of the four-armed pipe-fitting 6 are each provided with a pair of oppositely located integral wedges 7 the points of which turn outward and terminate well within the outer ends of the said arms. These four pairs of wedges 7 are symmetrically located so that each pair occupies the same relative position in the respective arms of the fitting. The bores or interior chambers 8 of the said arms 2, 3, 4 and 5, instead of being made cylindrical in the ordinary way, are made tapering with their larger ends inward to conform to the arrangement of the wedges 7 the larger ends of which are arranged inward.

With such a fitting as above described, pipe-lengths or pipe-sections 9 are used, but instead of being threaded in the common way, their inner ends are formed with oppositely located slots or cuts 10 corresponding substantially in depth to the tapering bores 8 of the fitting. Now when the pipe-sections so slotted are driven into the respective arms 2, 3, 4 and 5 of the fitting 6 with their slots 10 carefully alined with the pointed outer ends of the wedges 7, the pipes are forced inward over the wedges with the effect of expanding the slotted inner ends of the pipes into tapering form to conform to the taper of the bores 8 as clearly shown in Fig. 4, whereby the pipe-sections are firmly connected to the fitting against the possibility of being wrenched away from it or displaced.

My improvement, as I would clearly have it understood, may be applied to pipe-fittings of any form. Thus in Fig. 7, I have shown an elbow pipe-fitting 11 the arms 12 and 13 of which are provided with internally arranged outwardly pointed integral wedges 14, while the bores 15 of the arms are tapered accordingly with their outer ends smaller than their inner ends. It is apparent that the pipe 9 shown in Fig. 5 may be applied to the elbow pipe-fitting 11 in precisely the same manner as shown in Fig. 4. So, too, the sleeve-like coupling or pipe-fitting 16 illustrated in Fig. 8, has its opposite ends formed with pairs of integral outwardly pointing wedges 17 located within tapering bores 18 the outer ends of which are smaller than their inner ends. Slotted pipes like the pipe 9 may also be applied to the coupling 16 in the same way as illustrated in Fig. 4. It is immaterial whether my improved pipe-fitting has one or more arms formed with tapering openings containing outwardly pointing wedges. It is also apparent that one or more wedges may be employed within each arm as desired. Preferably, however, two wedges will be used. In any case the wedge or wedges will be formed upon the side walls of the tapering bore or bores into which they will laterally project. Under this arrangement the pipes will be expanded without being obstructed, as must happen when the wedges are located in line with the centers of the bores. I call attention to the fact that each wedge is supported laterally along its inner edge and is thus left free both at its point and base. Each wedge is therefore supported along its side instead of its base as heretofore in constructions in which wedges have been used.

I claim:—

1. As a new article of manufacture, a pipe-fitting having an arm formed with a tapered bore and provided with an outwardly pointing wedge extending laterally inward into the said bore from the side wall thereof and supported from end to end along its inner edge by the said wall and free at its point and base, whereby a slotted pipe inserted into the bore will be expanded by the wedge and thus fastened to the fitting.

2. As a new article of manufacture, a pipe-fitting having an arm formed with a tapered bore, and a plurality of oppositely located outwardly pointing wedges extending laterally inward from the side walls of the said bore, whereby a slotted pipe inserted into the bore will be expanded by the wedges and thus fastened to the fitting.

In testimony whereof, I have signed this specification in the presence of two subscribing witnesses.

DAVID G. ANDERSON.

Witnesses:
J. M. KITTLE,
F. H. GAME.